United States Patent

[11] 3,590,358

| [72] | Inventor | Murray A. Ruben<br>Belmont, Mass. |
|---|---|---|
| [21] | Appl. No. | 694,968 |
| [22] | Filed | Jan. 2, 1968 |
| [45] | Patented | June 29, 1971 |
| [73] | Assignee | Tyco Laboratories, Inc.<br>Waltham, Mass. |

[54] ELECTRONIC BATTERY CHARGER
9 Claims, 4 Drawing Figs.

[52] U.S. Cl. .................................................... 320/39,
320/24, 321/18, 323/22
[51] Int. Cl. .......................................................... H02j 7/10
[50] Field of Search ........................................... 320/20, 22,
23, 24, 39, 40, 5, 25, DIG. 1, DIG. 2; 321/18,
21—24; 323/22, 24

[56] References Cited
UNITED STATES PATENTS

| 3,160,805 | 12/1964 | Lawson, Jr. ................. | 320/39 |
| 3,252,070 | 5/1966 | Medlar et al ................. | 320/21 |
| 3,270,270 | 8/1966 | Yenisey ........................ | 321/18 |
| 3,281,638 | 10/1966 | Crawford ...................... | 320/40 |
| 3,363,162 | 1/1968 | Bawden ....................... | 320/SCR (UX) |
| 3,487,284 | 12/1969 | Cady ............................ | 320/40 |
| 3,373,337 | 3/1968 | Hung ............................ | 323/24 |
| 3,414,798 | 12/1968 | Nielsen ......................... | 321/24 |
| 3,466,529 | 9/1969 | Grafham ...................... | 323/22 |
| 3,300,704 | 1/1967 | McMillen ..................... | 320/SCR (UX) |
| 3,363,163 | 1/1968 | Nord et al. ................... | 320/SCR (UX) |
| 3,258,672 | 6/1966 | Godshalk et al. ............. | 320/25 |
| 3,310,729 | 3/1967 | Burgess et al. ............... | 323/22 |
| 3,375,427 | 3/1968 | Magher et al. ............... | 321/18 X |
| 3,421,063 | 1/1969 | Reinke ......................... | 320/5 |
| 3,412,308 | 11/1968 | Brown .......................... | 320/24 |

*Primary Examiner*—J. D. Miller
*Assistant Examiner*—John M. Gunther
*Attorney*—Nicholas A. Pandiscio ABSTRACT: A battery charger adapted to charge a battery at a rapid rate by controlling the average AC input voltage through a nonsymmetrical phase control action that is triggered by the open circuit potential of the battery being charged. It comprises a two-stage transformer-coupled charging circuit in which the primary stage includes a gated AC switch in series with the transformer's primary winding and secondary stage includes a full wave rectifier with output terminals adapted to be connected to the battery to be charged. The switch is closed on each half cycle by gating pulses generated by a phase control circuit which senses the state of charge of the battery by measuring its open circuit potential.

INVENTOR.
MURRAY A. RUBEN

INVENTOR.
MURRAY A. RUBEN
BY
Nicholas A. Pendiscio
ATTORNEY

ELECTRONIC BATTERY CHARGER

This invention relates to solid state electronic battery chargers and more particularly to a constant voltage type charger adapted to charge at a rapid rate without generation of significant gassing in the battery.

PRIOR ART

Rapid rate battery chargers of the type old in the art generally consists of two general forms. The first form, commonly known as a constant current charger, simply comprises a tapped transformer, a rectifier stage, and a switch capable of delivering current at one of two or more fixed charging rates. The switching is conducted on the basis of either a manually set timer or on the basis of the measured voltage rise of the battery. The second form is a constant voltage charger with a means of adjusting the charging current to maintain a fixed DC voltage during charge. The means of adjusting the charging current commonly comprises a silicon controlled rectifier (hereinafter termed an "SCR") in series with the pulsating DC output of rectifiers on the secondary of the input transformer. Constant current chargers are not capable of approximating the most rapid recharge unless a very large number of charging rate steps are used. However, usually a constant current charger has only two steps, with the result that the charging cycle is relatively long and is characterized by significant end-of-charge gassing and overcharge. The constant voltage chargers, which are designed to maintain a constant DC potential, provide more rapid battery recharge, but the charging voltage must be very carefully controlled since small errors in the charging voltage result in large errors in the overcharge or undercharge delivered to the battery. Consequently constant voltage chargers are usually current limited to prevent the extremely high charging currents that are possible. Heretofore constant voltage chargers designed for rapid charging of large batteries have generally involved the use of magnetic amplifiers rather than SCR's for control in the secondary since SCR's with a relatively large current capacity are very large and are necessarily very expensive. More, they dissipate considerable power and hence require large heat sinks. However, magnetic amplifiers also very large, and bulky, with the result that the chargers themselves are large, heavy and costly.

OBJECTS AND SUMMARY OF THE INVENTION

The primary object of the invention is to provide a new and improved electronic battery charger that is capable of recharging a battery at substantially the fastest possible rate of recharge without generation of significant gassing rate of recharge without generation of significant gassing in the battery.

A further object of the invention is to provide a high rate battery charger wherein the average DC charging current supplied to the battery is controlled by controlling the average AC input voltage through a nonsymmetrical phase control action that is triggered by the open circuit battery voltage, i.e., the voltage of the battery between successive charging current pulses.

A further specific object of the invention is to provide a high rate battery charger for charging large size batteries which requires substantially smaller and less expensive control elements and has lower overall power dissipation that high rate battery chargers heretofore available.

It is well known that controlled rectifiers capable of handling high voltages and low currents are less expensive and involve less power dissipation that controlled rectifiers adapted to handle low voltages and high currents. Furthermore conventional power diodes capable of handling large currents at low voltages are readily available in various sizes and are substantially cheaper than controlled rectifiers. Accordingly a further object of the invention is to provide an electronic battery charger involving the use of controlled rectifiers to control the primary AC power input rather than the DC rectified output of a power transformer.

Essentially a battery charger constructed in accordance with this invention involves a two-stage transformer-coupled charging circuit. The secondary stage comprises a full wave rectifier made up of conventional power diodes and a pair of output terminals for applying the rectifier's output to a battery to be charged. The primary stage comprises a pair of input terminals adapted to be connected to an AC source and an AC switch in the form of a triac or an inverse parallel pair of controlled rectifiers connected in series with the input terminals and the transformer's primary. The charger also essentially comprises a phase control circuit for closing the switch (i.e., triggering the triac or SCR's) on each primary AC phase reversal with the switch closing at a phase angle that is determined by the open circuit voltage of the battery being charged. The phase control circuit is triggered by the open circuit voltage of the battery being charged which is made available for measurement on reopening of the switch, i.e., termination of controlled rectifier or triac conduction on each primary AC phase reversal. The phase control circuit is referenced to each AC phase reversal, e.g., by a transformer which is coupled across the two SCR's or triac so as to faithfully transmit the SCR or triac phase angle to the control circuit.

Other objects, features and advantages of the present invention are described or rendered obvious from the following detailed specification which is to be considered together with the accompanying drawings, wherein.

The present invention is based on the principle that the state of charge of a lead acid battery (and, in principal, other battery couples as well) can be determined by dynamic measurement of the open circuit voltage of the battery made at the battery terminals during and immediately following the application of a known charging current pulse. This charging principle, which involves use of dynamic rather than static parameters, can be effectively implemented in a practical battery charger if the charger comprises the following: (1) a controllable source of pulsed direct current that is capable of being turned on and off periodically; (2) a means of controlling the current source such that a command to turn the current source on is remembered from the time of its initiation until the next periodically occurring turnoff command, so that the current source, once commanded on, remains on until the next turnoff command; and (3) a highly sensitive means of (a) sampling the state of charge of the battery as it is being charged by sensing its open circuit voltage with respect to a predetermined reference level, and (b) commanding the current source to turn on at a phase angle which increases with increasing state of charge.

The reason for these requirements may be appreciated by the following general description of the operation of a charger constructed in accordance with the foregoing requirements. Assume that a battery is at rest and that a charger is turned on. The battery potential being low, the current is commanded on. Full current pulses will immediately follow. During the time current is flowing into the battery, the battery potential measured by the charger may be above the reference level due to the presence of series resistance. For this reason a separate memory is employed which maintains current flow until the next periodic turnoff command. At this interruption of current flow, the battery voltage immediately falls to its open circuit value, and then decays toward its steady state value. The faster the battery voltage decays, the sooner the charging current is turned on again and the larger will be the average charging current. The open circuit voltage only falls rapidly at low states of charge and at low states of charge, the battery can accept a large average charging current. As the battery charges up the time required for its voltage to fall down to a steady state level during the time that no charging current flows becomes increasing longer, and the average charging current is accordingly reduced. This action, which directly uses the rate of decay of the relaxation potential of the battery to sense its state of charge and accordingly control its charging current, effectively attempts to charge the true internal electromechanical potential of the battery to a constant value. In this way the most rapid recharge theoretically possible can be achieved.

Figure 1:
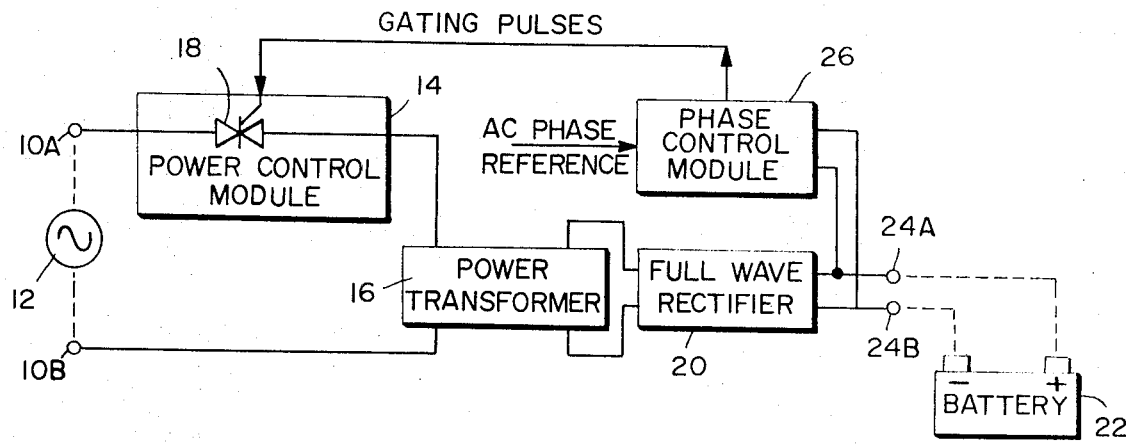
FIG. 1 is a block diagram of a battery charger embodying the present invention.

Turning now to FIG. 1, a battery charger constructed in accordance with this invention essentially comprises a pair of input terminals 10A and 10B which are adapted to be coupled to an alternating current source 12 which may be representative of a conventional power line. The terminals 10 are connected through a power control module 14 to the primary of a power transformer 16. The power control module comprises a triac 18 connected as shown so that on application of a gate signal it will fire in either direction depending upon the polarity, i.e., phase, of the AC input. The power control module is essentially a switch and, by being turned on and off, it functions to control the average AC voltage applied to the power transformer. The secondary of the power transformer is coupled to a full wave rectifier 20 which supplies DC current pulses to a battery 22 to be charged. The rectifier has a pair of output terminals 24A and 24B which are adapted to be connected to the terminal posts of battery 22. Connected across output terminals 24, and hence across the battery 22, is a phase control module 26 which comprises (a) means for measuring the open circuit AC potential of the battery and developing a control voltage which is proportional to the rate of decay of the open circuit potential of the battery and hence varies inversely with the battery's state of charge, and (b) means for producing a gating pulse on each half cycle after a delay $\alpha$ measured with respect to each primary AC crossing that is proportional to the control voltage. The control module has an AC phase reference input that locks its operation so that the gating pulse delay time is related to each primary AC voltage crossing. The AC phase reference input may be derived directly across the input terminals 10 or across the power control module 14. The gating pulses generated by the phase control module are applied to the power control module to cause conduction of the triac in one direction or the other according to the phase of the AC input, with the firing angle of the triac being determined by the gating pulse delay time. Each time the triac conducts it energizes the power transformer and the latter causes the full wave rectifier to generate a direct current pulse to the battery. Thus the average AC voltage applied to the power transformer is determined by the firing angle of the triac, and the average DC current applied to the battery is determined by the average AC voltage applied to the power transformer.

Figure 2:
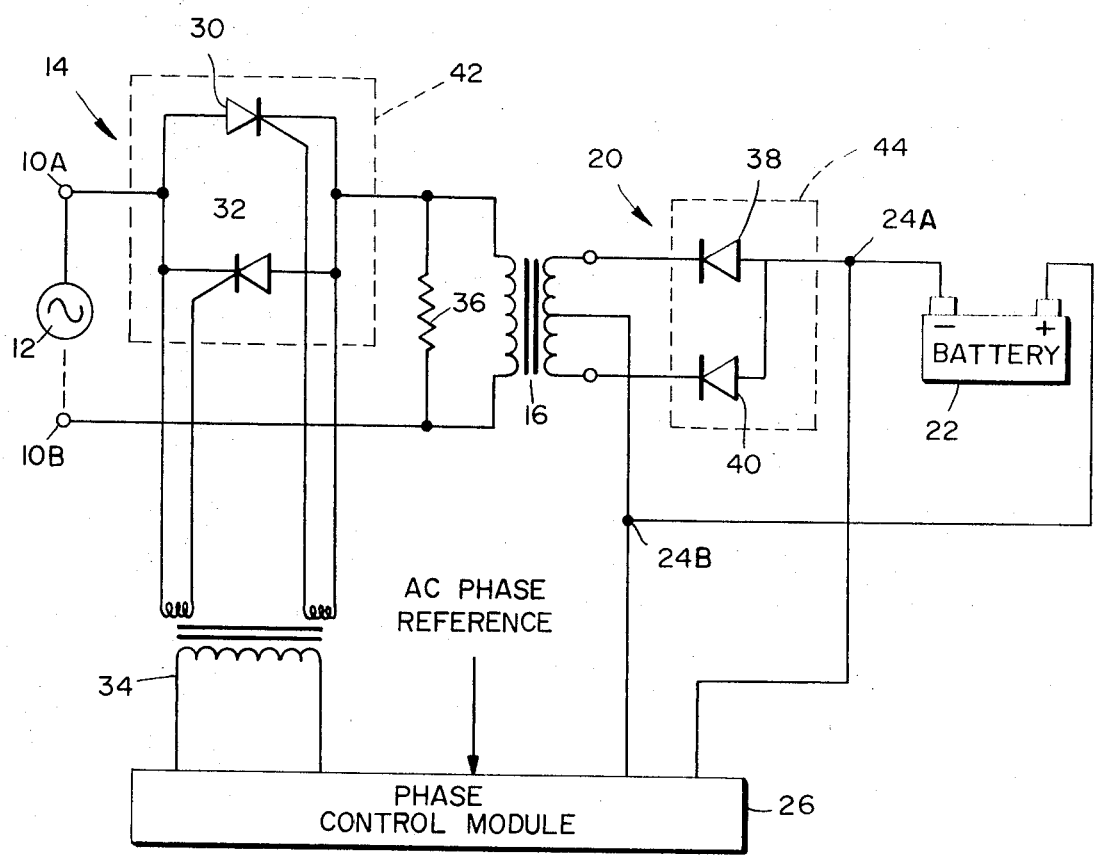
FIG. 2 is a modification of the diagram of FIG. 1 showing further details of the invention.

As indicated above, the power control module may include a pair of SCR's connected back to back in lieu of triac 18. This substitution is illustrated in FIG. 2 which shows further details of the system of FIG. 1. As shown in FIG. 2, the power control module 14 comprises a pair of SCR's 30 and 32 connected back to back in series with the primary of power transformer 16. Gating signals generated by phase control module 26 are applied to the SCR's by a pulse transformer 34 having two secondary coils, one connected between the cathode and gate or SCR 30 and the other connected between the corresponding terminals of SCR 32. In addition, a resistor 36 is connected across the primary of the power transformer. Resistor 36 has a value which helps linearize the power transformer so as to main phase relation between its primary and secondary, thereby assuring that each SCR will not be hung up in the "on" condition by the transformer's exciting current after an input AC phase reversal occurs, with the result that each SCR shuts down immediately when the primary AC voltage changes phase. It is to be noted that if one SCR is hung up, it will prevent the other from firing on the next half of the input AC cycle. This is to be avoided since it will rapidly cause the power transformer to be driven to saturation and subsequent breakdown. The full wave rectifier 20 consists simply of a pair of diodes 38 and 40 with their anodes coupled together to one of the output terminals 24A which is connected to the negative terminal of the battery. The positive terminal of the battery is connected via output terminal 24B to a center tap on the secondary of transformer 16. A charger designed in accordance with the arrangement of FIG. 2 operates essentially the same as the charger of FIG. 1. The phase control module generates gating pulses which are applied by way of pulse transformer 34 to the gates of SCR's 30 and 32, so that one or the other conducts according to the phase of the AC input. Assuming that the battery is not fully charged, during each full AC cycle both SCR's fire, one firing on one half cycle and the other firing on the next half cycle. Each time an SCR conducts the power transformer causes the full wave rectifier to generate a discrete direct current pulse. With the control module 26 functioning in the manner described above in connection with the system of FIG. 1, each gating pulse triggers an SCR to conduction at a firing angle determined by the gating pulse delay time. Since the gating pulse delay time varies inversely with the battery's state of charge, the average AC voltage applied to the power transformer will decrease and hence the average DC current applied to the battery will decrease as the battery is charged up.

An essential aspect of a battery charger embodying the system of FIG. 1 of FIG. 2 is that the power control module is in the primary stage while the full wave rectifier is in the secondary stage. In practice this enables the power control module and the full wave rectifier to be spaced from one another and allows each to have its own heat sink. It is obvious that the heat sink for the power control module, represented schematically by the dotted lines 42 in FIG. 2, may be relatively small in view of the fact the SCR's 30 and 32 and triac 18 are not required to handle large currents, while the heat sink for the full wave rectifier represented at 44 is required to be quite large in order to adequately dissipate the heat generated by the large currents passing through diodes 38 and 40.

It is to be appreciated that the phase control module has been described above substantially only in terms of its basic function and general mode of operation because its circuit design may vary greatly according to the degree of phase control required, the number and types of accessory features (e.g. indicator lamps, etc.), the size of the battery to be charged (e.g. 6, 12or 24volt battery), and other economic considerations. Specific details of a preferred phase control circuit are provided in FIGS. 3A and 3B which illustrate a preferred embodiment of the invention designed to charge a 12-volt lead acid battery at a maximum current input of 50 amps. In this preferred embodiment of the invention the control module is made as a plug-in unit having its own container and heat sink.

Figure 3A:
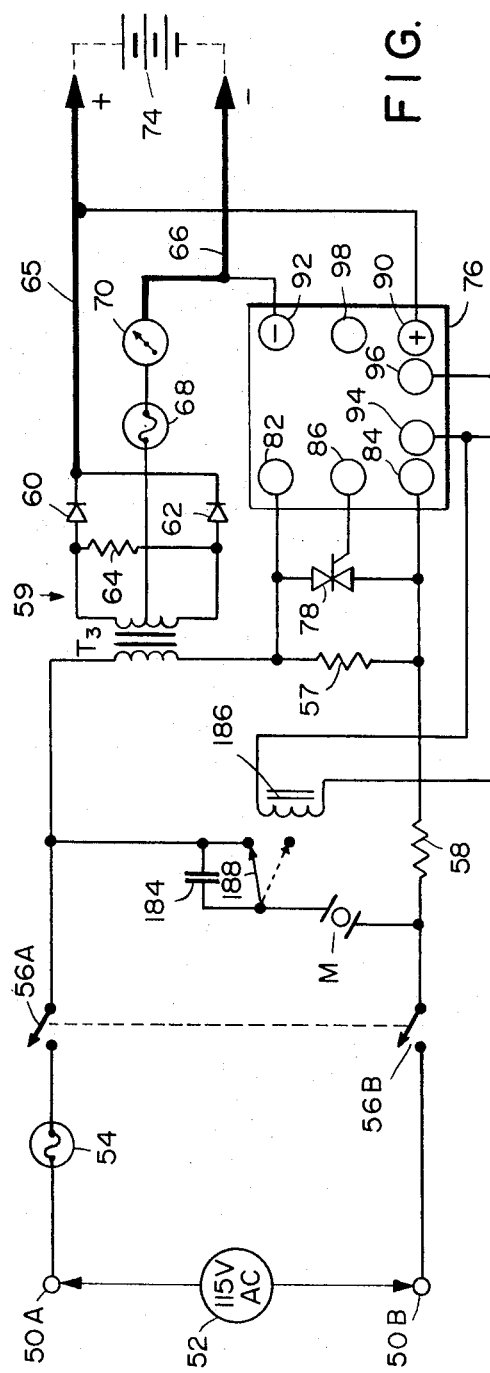
FIGS. 3A and 3B together constitute the complete circuit diagram of a preferred embodiment of the invention.

Turning now to FIG. 3A, the battery charger circuit comprises a pair of input terminals 50A and 50B adapted to be coupled to a 115-volt AC power line represented as AC source 52. Connected in series with the two input terminals are an 8-ampere fuse 54, an on-off switch unit consisting of a pair of ganged single pole, single throw switches 56A and 56B, the primary coil of a power transformer $T_3$ having a center tapped secondary coil, a 300-ohm resistor 57, and a 1-ohm resistor 58. The transformer $T_3$ is adapted to step down from an input of 120—105 volts to 24 volts across its secondary and may be a Signal 024—24 transformer The secondary of power transformer $T_3$ is connected to drive a full wave power rectifier 59 comprising a pair of power diodes 60 and 62 and a 25-ohm resistor 64. The opposite ends of the transformer's secondary are connected to a terminal bus 65 via the power diodes 60 and 62. The resistor 64 is connected across the secondary of transformer $T_3$. The center tap of the power transformer is connected to a second terminal bus 66 via a 75-amp fuse 68 and an ammeter 70 with a dial (not shown) having a calibrated scale, ranging from 0 to 50 amps DC. It is to be understood that terminals buses 65 and 66 are adapted to be connected to the positive and negative terminals respectively of a 12-volt lead acid battery 74. The circuit shown in FIG. 3A further includes a terminal connector board 76 having eight discrete socket-type terminals and a triac 78 connected across resistor 57 in series with the primary of transformer $T_3$. Two of the eight terminals 82 and 84 are connected to opposite sides of triac 78. A third terminal 86 is connected to the gate of triac 78. Another pair of terminals 90 and 92 are connected to the positive and negative terminal buses 65 and 66 respectively. Two other terminals 94 and 96 are connected by an indicator lamp 99 which is of the 12 ESB type having a rating of 12 volts and 35 milliamps. The eighth terminal 98 is not connected unless the triac is replaced with an inverse pair of SCR's. It is believed apparent that FIG. 3A embodies all of the circuit units shown in FIG. 1 except for the phase control module, with the triac 78 corresponding to the triac 18, the transformer $T_3$ corresponding to transformer 16, and the diodes 60 and 62 and the interconnections therefor between the secondary of transformer $T_3$ and the terminal buses 65 and 66 comprising a full wave rectifier corresponding to rectifier 20. The resistor 64 serves the same function as resistor 36 shown in FIG. 2.

Figure 3B:
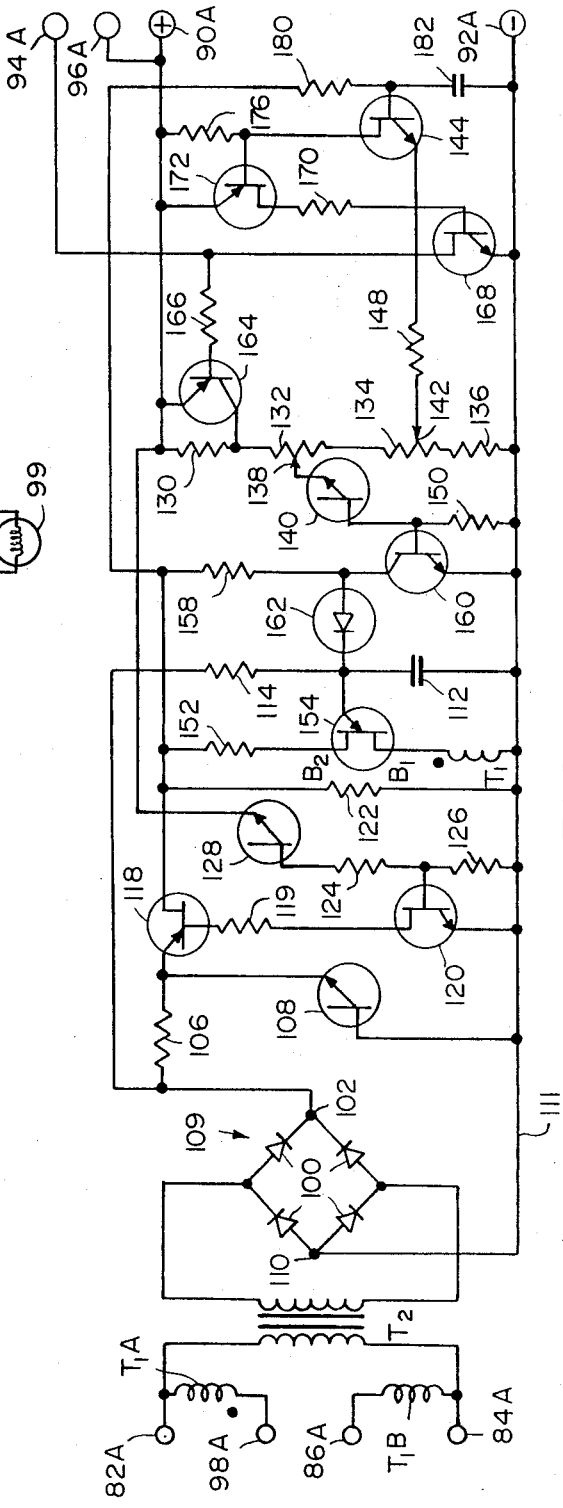

Turning now to FIG. 3B the control module comprises a connector member (not shown) that has eight plug-in type terminals 82A, 84A, 86A, 90A, 92A, 94A, 96A AND 98A adapted to plug into the correspondingly numbered socket terminals connector board 76 shown in FIG. 3A. Terminals 82A and 84A are connected to the primary winding of a 115-volt/40-volt stepdown transformer $T_2$ which may be a Triad F 90X unit. Connected between terminals 82A and 98A is one of two secondary windings $T_1A$ of a pulse transformer $T_1$. connected between terminals 86A and 84A is the other secondary winding $T_1B$ of pulse transformer $T_1$. The pulse transformer may be a Sprague 11z13 Trigate unit. At this point it is to be noted that winding $T_1A$ is not used since terminal 98 is unconnected. However, this is true only if triac 78 is used. If the triac is replaced by an inverse parallel pair of SCR's then both secondary windings of pulse transformer $T_1$ are used, since terminal 86 will be connected to the gate of one SCR and terminal 98 will be connected to gate of the other SCR. The windings $T_1A$ and $T_1B$ are wound so as to generate positive pulses (represented in FIG. 3B by dots located adjacent to the windings) toward terminals 98A and 86A when SCR's are used and a positive pulse towards terminal 84A when triac 86 is used. The secondary winding of transformer $T_2$ is connected to a bridge rectifier comprising four TWV-type diodes 100. One of the output terminals 102 of the bridge rectifier is connected by a 680-ohm resistor 106 to the emitter of an NPN transistor 108. Transistor 108 and the other NPN transistors hereinafter described may be of the 2N 3568 type. The base of transistor 108 is connected directly to the other output terminal 110 of the bridge rectifier and also is connected to connector terminal 92A by a lead 111. The collector of transistor 108 is unconnected so that it functions as a zener diode. It is to be noted that transistor 108 and the other NPN transistors herewith described which function as zeners are selected so as to break down at a reverse voltage of about 10.5 volts. The bridge rectifier terminal 110 also is connected to the bridge rectifier's other output terminal by a one-tenth microfarad capacitor 112, a 1-megohm resistor 114 and lead 111.

The junction of resistor 106 and the emitter of transistor 108 is connected to the emitter of a PNP transistor 118. Transistor 118 and the other PNP transistors hereinafter described may be of the 2N 3638 type. The base of transistor 118 is connected by a 10-kilohm resistor 119 to the collector of an NPN transistor 120 whose emitter is connected to lead 111. The collector of transistor 118 also is connected to lead 11 by a 10-kilohm resistor 122. The base of transistor 120 is connected to the junction of two resistors 124 and 126 each having a value of 1 kilohm. The opposite end of resistor 126 is tied to lead 111 while the other end of resistor 124 is tied to the base of an NPN transistor 128 whose collector is unconnected so it may function as a zener diode. The emitter of transistor 128 is connected to terminal 90A and also to lead 111 by way of voltage divider network consisting of a 27-ohm resistor 130, a pair of 250-ohm resistor 136. It is to be noted that resistors 132 and 134 form part of two separate trimmer potentiometers with the removable contact 138 of one potentiometer connected to the emitter of an NPN transistor 140 and the moveable contact 142 of the second potentiometer connected to the emitter of an NPN transistor 144 by way of a 47-kilohm resistor 148. The base of transistor 140 is connected to lead 111 by way of a 270-ohm resistor 150 while its collector is unconnected so that it functions as a zener diode. Connected between the collector of transistor 118 and lead 111 is a 270-ohm resistor 152, a unijunction transistor 154, and the primary winding of a pulse transformer $T_1$. The Base $B_2$ of transistor 154 is connected to transformer winding. Transistor 154, which may be type 2N 4871 or 2N 2646, has its emitter connected to the junction of resistor 114 and capacitor 112. Also connected between the collector of transistor 118 and lead 111 is a 1-kilohm resistor 158 and an NPN transistor 160. Transistor 160 has its collector connected to resistor 158 and its emitter tied directly to lead 111, while its base is connected to the junction of resistor 150 and the base of transistor 140. The anode of a type 1N 4154 diode 162 is connected to the collector of transistor 160, while its cathode is connected to the emitter of unijunction transistor 154. It is to be noted that capacitor 112, resistor 114, resistor 158, transistor 160 and diode 162 provide a cosine-modified ramp voltage for the emitter of unijunction transistor 154 with the ramp function starting from a variable pedestal voltage determined by the degree of conduction of diode 162 and transistor 160. The terms "cosine-modified ramp" and "pedestal voltage" are employed herein in the same sense as they are employed in the General Electric SCR Manual, 4th Edition, pages 189—195.

A PNP transistor 164 is connected across resistor 130, with its emitter tied to the emitter of transistor 128 and its collector tied to the junction of resistors 130 and 132. The base of transistor 164 is connected by a 4,700-ohm resistor 166 to the collector of an NPN transistor 168 whose emitter is tied to lead 111. The collector of transistor also is connected directly to connector terminal 94A. The base of transistor 168 is connected by 4,700-ohm resistor 170 to the collector of PNP transistor 172 whose collector is connected to the emitter of transistor 164 and connector terminal 90A. The base of transistor 172 is connected to its emitter by a 4,700-ohm resistor 176, and also is connected to the collector of transistor 144. The junction of resistor 158 and the collector of transistor 118 is connected to lead 111 by a 270-kilohm resistor 180 in series with a 10-microfarad capacitor 182. The base of transistor 144 is connected to the junction of resistor 180 and capacitor 182.

An additional feature of the charger shown in FIGS. 3A and 3B is a a fan (not shown) disposed so as to circulate cooling air past the heat sinks and the control module when charging current is being supplied to a battery. The fan is driven by a motor M which is connected in parallel with the the primary of transformer $T_3$ by a capacitor 184 and a relay comprising normally closed contacts 188 connevted across capacitor 184 and a coil connected terminals 94 and 96. As explained in greater detail hereafter, fan motor M starts operating when the charger is turned on. It goes off and lamp 99 goes on when the battery is fully charged.

It is to be noted that the phase control circuit shown in FIG. 3B comprises an "overshoot" circuit which is adapted to establish a first battery reference potential for zener 140 during the initial part of a charging operation and then shift to a second lower battery reference potential as the battery nears full charge. As explained in greater detail below, this "overshoot" circuit causes the average charging current to drop off rapidly to substantially zero when the battery is substantially fully charged, thereby preventing detrimental overcharging.

At this point it is to be appreciated that the average charging current delivered to the battery will vary with the average firing angle of the triac 78 which is triggered when it receives a gating pulse from transformer $T_1$. Since transformer $T_1$ produces a gating pulse only when unijunction transistor 154 fires, the firing phase angle of triac 78 is determined by the firing phase angle of transistor 154. The phase control circuit shown in FIG. 3B is arranged so that unijunction transistor 154 fires early in each half cycle of the AC input (at a phase angle of about 50°) when the battery has a low charge and fires progressively later in each half cycle as the battery charges up to its full potential. The progressively increasing delay in the firing of transistor 154 is achieved by causing the exponential ramp function (i.e., the increase in the unijunction's emitter voltage produced by the exponential charging of capacitor 112) to start from a progressively lower pedestal. In this connection it is to be appreciated that small changes in pedestal height produce large changes in phase angle triggering. Accordingly the circuit is arranged so that lowering of the pedestal height does not start until the battery has received a substantial charging current, but before it is near fully charged.

Triggering of the unijunction transistor occurs when its emitter reaches its peak-point (or triggering) voltage which is determined by the interbase voltage. With respect to the illustrated embodiment of the invention, the emitter triggering voltage is about $0.7_{BB}$. The voltage at base $B_2$ is controlled by transistor 118 and goes up with increasing conduction of transistor 118 to a maximum value determined by clamping zener 108. As indicated above, the triggering voltage applied to the emitter of transistor 154 comprises a cosine-modified ramp starting from a variable pedestal. The cosine-modified ramp is derived by charging capacitor 112 through resistor 114 with the unclamped output of bridge rectifier 109, while the pedestal voltage is derived by charging 112 via resistor 158 and diode 162, with the pedestal height being determined by the degree of conduction of transistor 160. The pedestal can reach its maximum height only when transistor 160 is not conducting and drops progressively lower with increasing conduction of transistor 160. Conduction of transistor 160 lowers the voltage on the anode 162, causing it to conduct less and thereby charge capacitor 112 to a lower pedestal voltage. The degree of conduction of transistor 160 is controlled by zener 140. So long as zener 140 is off, transistor 160 will not conduct. However, when zener 140 fires, it supplies base current to transistor 160 and thereby causes the latter to conduct. The heavier zener 140 conducts, the more transistor 160 conducts. Operation of zener 140 is determined by the battery voltage appearing across terminals 90A and 92A and the setting of potentiometer tap 138. The voltage picked off by tap 138 is determined by the battery voltage and the resistor network (consisting of resistors 130, 132, 143, and 136) connected across terminals 90A and 92A. The transistor 164 connected across resistor 130 is off when the charger is delivering current to the battery by repetitive firing of triac 78 (this may be termined the "fast charge mode"). However, when the battery reaches full charge, transistor 164 goes on and effectively shunts resistor 130, so that thereafter the battery potential is applied across only resistors 132, 134 and 136. This effectively lowers the voltage required to be present across the resistor network for tap 138 to pick off a voltage large enough to fire zener 140.

In this connection it is to be noted that with each charging current pulse the battery voltage will rise temporarily and then drop down again after the charging current terminates. The battery's relaxation potential, i.e., the open circuit potential of the battery between successive current pulses, will tend to drop to a steady level at a rate which is an inverse function of its state of charge. If the battery has a low charge, its relaxation potential will tend to drop rapidly to a steady state value; as the battery continues to be charged, its relaxation potential will drop at a slower rate to a steady state value. Hence if the open circuit potential drops rapidly to the point where the voltage picked off by tap 138 is insufficient to trigger zener 140, a high pedestal voltage is provided for the emitter of unijunction transistor 154 and it will fire early in the half cycle, providing a large charging current pulse to the battery. On the other hand, if the open circuit potential drops slowly to the point where the voltage picked off by tap 138 is sufficient to trigger zener 140, zener 140 will be conducting when a pulse from bridge rectifier 109 is applied to capacitor 112 via resistor 114 with the result that the cosine-modified ramp will start from a lower pedestal. Because of the lower pedestal, the capacitor 112 will take longer to charger up to the firing level of transistor 154, so that the latter will fire later in the half cycle and a smaller charging current pulse will be delivered to the battery.

Provision of means for shunting resistor 130 makes it possible to continue to deliver relatively large but progressively smaller charging current pulses to the battery right up to full charge when gassing begins to occur at the electrodes, and then rapidly reduce the average current to the point where very little or no charging current is supplied to the battery. Accordingly, the potentiometer tap 138 is set to some predetermined value (depending upon the voltage to which it is desired to charge the battery) calculated to vary the pedestal voltage as charging proceeds, and the transistor 164 is controlled so as to shunt resistor 130 and provide a new battery reference potential for the zener calculated to rapidly reduce the pedestal to a minimum level as the battery reaches full charge. In this connection it is to be noted that transistor 164 is controlled by transistors 144, 168 and 172, all of which are normally off of conducting very little until the battery approaches full charge, and the setting of potentiometer tap 142. When the battery is in a low state of charge, the triac 78 conducts early in each cycle. This shorts the primary of transformer $T_2$ and in turn causes the output pulses of bridge rectifier 109 to have a narrow pulse width, with the result that capacitor 182 will charge up slowly through transistor 118 and resistor 180. With the average voltage on capacitor 182 low, insufficient base current is supplied to transistor 144 and it will conduct very little or not at all. With transistor 144 off, its collector voltage will be high enough to prevent transistor 172 from conducting to any appreciable extent. The low collector current through transistor 172 in turn means low base current for transistor 168, so it too will be conducting very little or not at all and 2 collector voltage will be high enough to prevent transistor 164 from switching on and shunting resistor 130. Of course, the average voltage on capacitor 182 will increase as the triac fires later in each cycle since the transformer $T_2$ will be shorted out later in each cycle and hence the width of the pulses from rectifier 109 will be greater. The level which the voltage on capacitor 182 must reach to cause transistor 144 to conduct heavily is determined by the setting of potentiometer tap 142. Hence potentiometer tap 142 determines the battery potential at which resistor 130 is shunted to reset from the first higher to the second lower battery reference level. In the case of a conventional 12-volt battery, the potentiometer tap 142 is set so that with transistor 164 off, the 10.5-volt firing level of zener 140 is reached when the battery voltage appearing across terminal 92A, 92B is about 13.65 volts; with transistor 164 saturating so as to shunt resistor 130, the zener's firing level is reached when the battery voltage is about 13.15 volts. It is to be noted that the "average" open circuit voltage of the battery climbs as high as 14.5 volts.

The mode of operation of the battery charger shown in FIGS. 3A and 3B will now be described in greater detail.

Assume that the terminal buses 65 and 66 are connected to the positive and negative terminals of a 12-volt lead acid battery 74 and that input terminals 50A and 50B are connected to a 115-volt AC source, with the on-off switch 56A, B open. On closing the on-off switch, AC current will flow through the windings of motor M, causing it to operate the fan (not shown). At the same time a current will flow through the primary of transformer $T_3$. This current is quite small due to the current limiting action of resistors 57 and 58 and nonconduction of triac 78 and over about half of the line voltage will appear across resistor 57, i.e., across the primary of transformer $T_3$. Accordingly, the voltage generated across the secondary of power transformer $T_3$ will be relatively small and the full wave power rectifier circuit 59 will deliver no or negligible current to battery 74. However, the AC voltage appearing across the primary of transformer $T_2$ will cause the full wave bridge rectifier circuit 109 to produce a sinusoidally shaped DC pulse for each half cycle of the AC input. The first DC pulse put out by rectifier circuit 190 is applied to zener 108 and the emitter of transistor 118 via current limiting resistor 106 and also to the RC circuit consisting of resistor 114 and capacitor 112. Zener 108 fires when the voltage across its terminals reaches 10.5 volts. When zener 108 fires, it clamps the control circuit voltage, notably the voltage on the emitter of transistor 118, thereby setting a peak level for the voltage established at base $B_2$ and the anode of diode 162 when transistor 118 conducts, whether or not transistor 118 will conduct at all depends on the state of battery 74. If the battery voltage is too low, e.g., when the battery has a dead short or is in a state of deep discharge, the zener diode 128 will not fire and consequently transistor 120 will not be conducting. With transistor 120 off, no base current will be supplied to transistor 118 and, therefore, it will not conduct when a pulse from rectifier 109 is applied to its emitter. With transistor 118 prevented from conducting, the unijunction transistor 154 will be unable to fire and hence no charging current will be supplied to the battery. Hence zener diode 128 effectively determines whether the battery is in condition for charging and functions to allow the charger to pump current into the battery only if the battery is capable of accepting and retaining a fast charge.

Assuming that the battery is in a low state of charge but is capable of being charged up rapidly, its battery voltage will be sufficient to cause zener diode 128 to conduct, with the result that the pulse output of rectifier circuit 109 will cause transistor 118 to conduct lightly so that a small voltage is applied to the base $B_2$ of transistor 154. At about the same time the pulse output of rectifier circuit 109 is applied through resistor 114 to the capacitor 112, causing the latter to charge up exponentially from a high pedestal voltage established by conduction of diode 162 in response to the increased voltage on the collector of transistor 118. It is to be appreciated that the pedestal voltage is high because the open circuit battery voltage is too low to fire zener 140. Since the voltage at base $B_2$ is relatively low and since the capacitor 112 starts charging up from a high pedestal, the voltage on the emitter of unijunction transistor will rise very quickly to its triggering level and the unijunction transistor will fire very early in the half cycle of the AC input, i.e., at a small phase angle.

When unijunction transistor 154 fires, a gating pulse is generated by transformer $T_1$. This pulse is coupled by terminals 82A and 98A to the gate of triac 78, causing it to fire in one direction early in the half cycle of the AC input. Firing of triac 78 allows the power transformer to generate a large output which causes the power rectifier 59 to supply a larger DC current pulse to battery 74. It is to be noted that firing to triac 78 effectively shorts out the primary of transformer $T_2$, but this does not affect the charging current since transformer $T_1$ has already supplied a gating pulse to the triac and the latter, since it has a "memory" will continue to conduct until the input AC current drops to zero, which occurs when it completes one half cycle and starts another. On the next half cycle, the mode of operation just described is repeated, with the triac firing in the opposite direction early in the half cycle. It is to be noted that although the battery voltage may rise appreciably during the time that it is receiving current and hence cause conduction of zeners 128 and 140, the battery voltage will decay very rapidly after the charging current pulse has passed. Hence zener 128 will drop to its previous low level of conduction and zener 140 will go off before the next DC pulse is generated by rectifier circuit 109, so that the unijunction transistor 154 and in turn triac 78 will fire again at an early phase angle. The triac will continue to fire at an early phase angle and the resulting average charging current will continue to be high until the state of charge of the battery is such that its open circuit voltage tends to drop at a slower rate between current pulses, whereupon the zener 128 will be conducting harder and zener 140 may still be conducting when the next DC current pulse is generated by rectifier circuit 109. In practice the improved state of charge of the battery will affect zener 128 sooner than zener 140, with the result that transistor 118 will commence to conduct heavier with each output pulse from rectifier 109 while zener 140 will be off at the time the rectifier's output pulse is generated. Accordingly the capacitor 112 will still charge up according to a cosine-modified ramp waveform starting from high pedestal. However, the heavier transistor 118 conducts, the higher it will raise the voltage at base $B_2$ of unijunction transistor 154, with the result that a higher emitter voltage is required to trigger the unijunction transistor 154. Since capacitor 112 charges according to the time constant determined by its capacitance and the resistance of resistor 114, it will take longer for the cosine-modified ramp to bring the emitter to its new triggering level. Accordingly the unijunction transistor will fire later in each half cycle. This delayed firing of transistor 154 in turn causes the triac to fire later in the half cycle, with the result that the average charging current commences to fall off.

Eventually the battery will have received enough current for its open circuit for its open circuit potential to decay slow enough to keep zener 140 on at the instant that another output pulse is generated by rectifier circuit 109. With zener 140 on, sufficient base current is supplied to transistor 160 to cause it to conduct. Conduction of transistor 160 has the effect of lowering the voltage at the anode 48. As a consequence the pedestal voltage is lowered. Because of the lowered pedestal, a long time is required to bring the emitter of transistor 154 up to its firing level, and so transistor 154 will fire still later in the half cycle. As noted above, a small change in pedestal voltage produces a relatively large change in the firing angle of the unijunction transistor. Hence the average charging current will start to drop at a faster rate when the pedestal starts dropping. The higher the state of charge of the battery, the longer it takes for its open current potential to drop to a value low enough to extinguish zener 140. Hence with increasing battery charge the zener 140 will be conducting heavier and heavier at the times that rectifier 109 generates its pulses, the lower will be the pedestal voltage and the greater the phase angle at which transistor 154 will conduct, so that the average current will continue to diminish more rapidly as the battery nears full charge. This rate of decrease in the average charging current is accelerated still further when transistor 164 goes on and shunts resistor 130 in the manner described above. With transistor 164 fully on, zener 140 will be conducting so heavily that the pedestal voltage is minimum. Accordingly the capacitor 112 will charge to a relatively low level on each half cycle and hence the transistor 154 will not fire until very late in the half cycle (notably at a phase angle greater than about 120°), so that effectively very little (almost negligible) current is supplied to the battery.

As indicated above, the fan motor M goes off and the "ready" light 99 goes on when the battery is substantially fully charged. In practice this occurs when the battery is at about 90—95percent of its full charge. This mode of operation is controlled by transistor 168. As long as transistor 168 is not conducting or conducting very little, lamp 99 and the relay solenoid 186 are deenergized. However, when transistor 168 saturates, it connects lamp 99 and solenoid 186 across the charged battery, with the result that both the lamp and solenoid are energized. Switching on the light indicates that the battery is fully charged and ready for use. Energizing solenoid 186 causes contacts 188 to open, thereby shutting off the fan motor M.

It is to be appreciated that operation of the phase control circuit of FIG. 3B is referenced to each primary AC voltage half cycle by transformer $T_2$ which causes the rectifier circuit 109 to generate pulse to the RC circuit comprising resistor 114 and capacitor 112 and also to transistor 118 in cadence with each half cycle. Hence since the primary AC voltage has substantially a constant frequency, i.e., 60 cycles, per second, the zero crossings of the primary AC voltage provide precise reference points for the delay times, i.e., phase angles, of the gating pulses generated by transformer $T_1$.

A charger constructed in accordance with the circuit shown in FIGS. 3A and 3B offers a number of advantages. First of all it exhibits fast charge performance with automatic reset to a float mode when the battery is substantially fully charged. The nature of the state of charge sampling performed by its phase control circuit makes the charger's performance completely independent of normal AC line voltage fluctuations. The performance in the fast charge mode is automatically adjusted to achieve the fastest charging rate consistent with the charge acceptance capability of the battery, the charging current exhibiting an exponentially decreasing type of behavior characteristic of "rate of acceptance" charging for a given line voltage. The standby mode is rendered stable when the battery is full as a result of a feedback action involving the shorting of transformer $T_2$ by the triac and the charging of capacitor 182. The later the triac fires, the later in the cycle the transformer $T_2$ is shorted, and the greater the pulse width of the output of rectifier 109 which is applied to capacitor 182 via transistor 118 and resistor 180. At full charge, the output of the rectifier is large enough to keep capacitor 182 charged to the voltage required to maintain transistor 144 conducting. The latter in turn operates through transistors 172 and 168 to saturate transistor 164 and thus reduce the pedestal voltage to a minimum. However, this same feedback action allows the charger to apply steady and intermittent charging currents to compensate for all internal and external loss mechanisms. The charger may be used to recharge a battery that is connected to a load as well as a battery having no load across it. It is fully protected against reverse connection by suitable fusing and is protected against current overload by the automatic current cutoff action of zener 128. The current cutoff action will occur in the event of accidental short circuit, or the attachment of loads which greatly exceed the charger's current rating, or a battery having one or more shorted cells. Further advantages are considerable reduction in overall charger weight and size, reduced charger power dissipation, and use of relatively low current rating SCR's or triacs since the required current rating is 5 to 20 times lower than would be the case if they were used in the secondary of the power transformer. The reductions in size, weight and SCR or triac size allow overall cost savings. An incidental advantage of having the control SCR's in the primary is that they are isolated from possible damage due to incorrectly connected loads, i.e., reverse battery. It is to be noted also that the power rectifier common is common with one side of the battery, permitting the power rectifier to be mounted without requiring insulation when the charger is used in grounded electrical systems, and under the same conditions, eliminates the need for a separate heat sink for the power rectifier. The provision of ammeter 70 makes it possible to determine readily the average charging current. It also provides a measurement of battery capacity when the charger is operating in the exponential charging current mode. The total remaining ampere hours of capacity remaining to be delivered by the battery can be calculated within about 10 percent by simply reading the average current. A 10-ampere rate means the battery requires about 10 ampere-hours more charge. Hence if the battery has a maximum capacity of 30 ampere-hours, a 10-ampere rate means it already has about 20 ampere-hours capacity. However, using the charging current as a quantitative measure of battery capacity is only valid after the charger has been in operation for at least about 10 minutes. This time interval is to allow the steady state diffusion reactions within the battery to stabilize.

It is to be appreciated further that the design prinicples herein described permit scaling up the system for batteries with larger ampere-hour capacities and adapting the phase control circuit to batteries of different voltages, e.g., 24-volt batteries. The latter adaption is effected by changing zeners.

As used in the following claims, the term "gated junction reversible AC switch" denotes a triac or a pair of inverse parallel-connected controlled rectifiers. With respect to the foregoing term it is to be appreciated also that in place of the triac or inverse parallel-connected controlled rectifiers it is possible to employ an SCR controlled diode bridge of the type shown in the General Electric SCR Manual (4th Edition) page 146 (FIG. 8.3A). However, this alternate mode of controlling the charging current is not preferred since it requires more components (at least four diodes plus an SCR) and hence is more costly than using either a single triac or two inverse parallel-connected SCR's.

It is to be understood that the invention is not limited in its application to the details of construction and arrangement of parts specifically described or illustrated, and that within the scope of the appended claims, it may be practiced otherwise than as specifically described or illustrated.

I claim

1. A battery charger comprising:
   a power transformer having a primary and a secondary winding;
   an input circuit for said winding comprising a pair of input terminals for connection to a source of alternating current and a normally open gated junction reversible AC switch connected in series between one of said input terminals and said primary winding, said switch adapted to close and conduct said AC current for the duration of any half cycle thereof only if subjected to a gating signal during said half cycle and to reopen at the end of said any half cycle;
   an output circuit for said secondary winding comprising a pair of output terminals for connection to a battery and rectifier means connected between said secondary winding and said output terminals for producing in response to excitation of said secondary winding by current flowing in said primary winding charging current pulses in cadence with conduction of said AC current by said switch; and
   means for gating said switch at a phase angle that increases with increasing state of charge of said battery so that the average charging current supplied to said battery decreases as said battery is charged up;
   said means for gating switch comprising a unijunction transistor circuit, means for triggering said unijunction transistor to conduction according to the open circuit potential of said battery, and means for generating a gating signal each time said unijunction transistor is triggered to conduction;
   said means for triggering said unijunction transistor to conduction comprising means for establishing a pedestal voltage on the emitter of said unijunction transistor that varies inversely with the state of charge of said battery and means for exponentially raising the voltage of said emitter from said pedestal to the level at which said unijunction transistor is triggered during each phase reversal of the current from said AC source;
   said means for establishing said pedestal voltage comprising a resistor network connected across said output terminals, a transistor connected in circuit with the emitter of said unijunction transistor so that said pedestal voltage decreases with increasing conduction of said transistor, and a zener diode connected for reverse conduction between said resistor network and said transistor so that the degree of conduction of said zener diode is determined by the open circuit potential of said battery and the degree of conduction of said transistor increases with increasing reverse conduction of said zener diode.

2. A charger as defined by claim 1 further including means for preventing triggering of said unijunction transistor if the voltage of said battery is below a predetermined level.

3. A charger as defined by claim 1 further including means for preventing triggering of said unijunction transistor if the battery has a shorted cell.

4. A charger as defined by claim 1 further including means for reducing the charging current to a minimum when said battery is substantially fully charged.

5. A charger as defined by claim 4 wherein said last-mentioned means comprises means for reducing the pedestal voltage to a minimum level.

6. A battery charger as defined by claim 1 wherein said resistor network comprises means for establishing two separate reference potentials for said zener diode.

7. A battery charger as defined by claim 6 wherein said last-mentioned means comprises a switch connected across a portion of said resistor network, and further including means for closing said switch according to the state of charge of said battery.

8. A charger as defined by claim 1 wherein said AC switch comprises a pair of inverse parallel-connected controlled rectifiers, each have a gate electrode coupled to said gating means.

9. A charger as defined by claim 1 wherein said AC switch comprises a triac having its gate electrode connected to said gating means.